United States Patent [19]
Sampson

[11] Patent Number: 5,848,811
[45] Date of Patent: *Dec. 15, 1998

[54] APPARATUS FOR SOLVENT BONDING NON-POROUS MATERIALS TO AUTOMATICALLY CREATE VARIABLE BOND CHARTERISTICS

[75] Inventor: Richard K. Sampson, Fort Collins, Colo.

[73] Assignee: Value Plastics, Inc., Fort Collins, Colo.

[*] Notice: The term of this patent shall not extend beyond the expiration date of Pat. No. 5,460,413.

[21] Appl. No.: 899,501

[22] Filed: Aug. 1, 1997

Related U.S. Application Data

[63] Continuation of Ser. No. 432,613, May 1, 1995, abandoned, which is a continuation of Ser. No. 146,607, Nov. 2, 1993, Pat. No. 5,460,413, which is a division of Ser. No. 470,931, Jan. 26, 1990, Pat. No. 5,259,894.

[51] Int. Cl.⁶ .................................................... F16L 13/02
[52] U.S. Cl. ........................ 285/21.3; 285/22; 285/423; 285/285.1
[58] Field of Search ................................ 285/21.1, 21.2, 285/21.3, 22, 285.1, 423; 156/294, 305, 306, 64, 281

[56] References Cited

U.S. PATENT DOCUMENTS

| | | | |
|---|---|---|---|
| 2,301,664 | 3/1942 | Eggert | 156/295 |
| 2,500,053 | 3/1950 | Andrews | 156/308.6 |
| 3,581,416 | 6/1971 | Andrews | 430/14 |
| 3,928,110 | 12/1975 | Arconti et al. | 156/308 |
| 4,137,117 | 1/1979 | Jones | 156/294 |
| 4,181,549 | 1/1980 | McPhee | 156/146 |
| 4,256,333 | 3/1981 | Jones | 285/22 |
| 4,417,753 | 11/1983 | Bacehowski et al. | 285/21 |
| 4,426,243 | 1/1984 | Briggs et al. | 156/307.3 |
| 4,512,947 | 4/1985 | Wyle et al. | 264/343 |
| 4,595,446 | 6/1986 | Newkirk et al. | 156/356 |
| 4,651,382 | 3/1987 | Ktolick et al. | 16/124 |
| 4,810,318 | 3/1989 | Haisma et al. | 156/153 |
| 4,816,107 | 3/1989 | Collins et al. | 156/327 |
| 4,822,443 | 4/1989 | Dudowik | 156/379.7 |
| 4,842,305 | 6/1989 | Kistenich | 285/21 |
| 4,846,909 | 7/1989 | Klug et al. | 156/232 |
| 5,460,413 | 10/1995 | Sampson | 285/21.3 |
| 5,564,752 | 10/1996 | Sampson | 285/21.1 |

OTHER PUBLICATIONS

Malcolm W. Riley, "Joining & Fastening Plastics," Materials in Design Engineering, Jan. 1958, pp. 129–131.

*Primary Examiner*—Eric K. Nicholson
*Attorney, Agent, or Firm*—Santangelo Law Offices, P.C.

[57] ABSTRACT

An apparatus which creates a pre-engineered solvent bond is disclosed which acts to self-optimize the characteristics of the resultant solvent bond. These characteristics can thus be chosen by the part designer with confidence that inherent variations in the assembly process will not unduly impact the resultant bond. The design establishes a specific volume through integral tabs or removable shims within which solvent acts to precisely dissolve material so that the predetermined bond characteristics are automatically created without reliance upon assembler technique.

7 Claims, 5 Drawing Sheets

5,848,811
APPARATUS FOR SOLVENT BONDING NON-POROUS MATERIALS TO AUTOMATICALLY CREATE VARIABLE BOND CHARTERISTICS

This application is a continuation of application Ser. No. 08/432,613 filed on May 1, 1995, which is a continuation of application Ser. No. 08/146,407 filed Nov. 2, 1993, now U.S. Pat. No. 5,460,413, issued Oct. 24, 1995, which is a divisional of application Ser. No. 07/470,931, filed Jan. 26, 1990 and now U.S. Pat. No. 5,259,894.

A. BACKGROUND OF THE INVENTION

Generally the invention relates to the field of solvent bonding. Specifically, the invention relates to the action of the solvent itself to create a bond between at least two parts. In terms of the knowledge and skills involved, it is distinguished from such fields as the field of designing parts which may be bonded together to perform specific purposes, the field of devices to introduce solvent to parts for bonding, and the field of particular chemicals to serve as a solvent.

For many years the technique of joining two parts together through the action of a solvent has been utilized with varying degrees of success. The basic technique simply involves the introduction of a solvent to two surfaces which are then dissolved and which bond together after the solvent evaporates away. Perhaps due to the simplistic basis for the technique of solvent bonding, efforts at refining the technique have generally been based upon an assumption that the resultant bond should obviously be as strong as possible. Importantly, the present invention departs from this assumption and provides a technique through which bonds having a variety of characteristics can be repeatedly created. From the designer's perspective, the invention allows the particular characteristic (or combinations thereof) to be predetermined as appropriate for the particular application. The chosen characteristics are then created automatically through the action of the solvent itself. In so doing, this technique allows the designer the freedom to choose an end result which may have characteristics within a broad range of possibilities. These characteristics include-but of course, are not limited to—the resultant bond's: strength, ability to seal, appearance, failure mode, etc. Significantly, the present invention affords the designer the opportunity to confidently know that the characteristics will be automatically created through the action of the solvent itself rather than through some manipulation or supervision at the assembly level.

Prior to the present invention, those skilled in the art of solvent bonding, seemed to focus their efforts in directions which might be characterized as either: i) efforts designed to control incidental effects of the bonding process, or ii) efforts to externally control the process to create the bond. This is perhaps due to the preconceptions of those involved that, of course, the strongest bond possible was always desired. Representative of the types of improvements directed toward controlling the incidental effects of the bonding process are several patents. In U.S. Pat. No. 4,651,382 to Krolick, a blocking moat design was disclosed to act as a barrier to prevent solvent from penetrating undesirable areas. In applications such as a door hinge, the moat served to avoid the introduction of the solvent to the moveable parts of the hinge itself and thus avoid an undesirable incidental effect of the solvent bonding process. Similarly, U.S. Pat. Nos. 4,256,333, 4,181,549, and 4,137,117 each disclosed designs for a solvent bonded joint which avoided the incidental effect of contamination by the solvent of medically pure fluids. In all of these cases, the inventors designed elements which would act to control some consequential effect of the bonding process. Notably, none of these inventions concern themselves with the characteristics of the resultant bond or—more to the point—with the automatic creation of specific bond characteristics.

The second group of directions those skilled in the art have taken has been the direction of externally controlling the bonding process. Interestingly in many of these types of improvements, the characteristics of the bond itself are not even mentioned. Representative of this direction is U.S. Pat. No. 4,595,446 to Newkirk for an apparatus which automates the application of solvent. Through Newkirk's invention, improvement to devices which create the bond are disclosed. Again, no consideration is given to the characteristics of the resultant bond itself. Rather, through lack of comment, there is a tacit acknowledgement that when it comes to the resultant bond, the solvent itself creates a bond having some characteristics and those characteristics are out of the designer's control.

The presupposition prior to the present invention that the characteristics of the bond itself were not controllable by the designer was most likely due to a bias by those skilled in the art to create the strongest bond in all instances. This is perhaps understood once it is realized that the creation of the solvent bond was generally accomplished as an assembly function. Thus, assemblers created the bond. These persons usually not only possessed a lesser degree of skill than designers but they usually also had little latitude in impacting improvements to the designs. These effects therefore lead to a focus on trial and error efforts or on solvent metering devices rather than unique part designs. This trial and error based level of expertise resulted in a field which may be characterized by slow, incremental improvement rather than dramatic innovation on a wide scale. The technology simply was not viewed as a highly sophisticated technology, rather it was viewed as a rather simple art in which minor improvements are the norm. Surprisingly, the need for and usefulness of bonds having variable characteristics which are automatically created through the action of the solvent has existed for some time. It is also true that the implementing arts and elements have been readily available throughout this time as well. Those skilled in the art simply did not appreciate the aspect of allowing for variable characteristics in the bond because they tended to assume that the strongest bond possible was always desired. This teaching away from the technical direction of the present invention was perhaps bolstered by unrelated arts such as heat bonding materials in which it is also assumed that the strongest bond possible is the most desirable.

B. SUMMARY OF THE INVENTION

Accordingly it is an object of the present invention to alert those skilled in the art of solvent bonding to the possibility of engineering the resultant characteristics of the bond itself rather than either assuming that the strongest bond is always desirable or merely accepting whatever type of bond that naturally occurs. Keeping with this broadly stated object, it is a goal of the invention to allow the designer a technique to simply assure that the chosen characteristics will be created upon production of the solvent bond. It is also an object to provide an invention which affords the designer the confidence of having such characteristics automatically created through the interaction of his or her design and the solvent rather than through reliance on some skill at the assembly level.

A further object of the present invention is to provide a technique through which changes to the characteristics of a resultant bond can be effected. An important attribute of this technique is that it not only allows for a variety of characteristics, but that it assures that the chosen characteristics be created. In keeping with this desire it is an object of the present invention to minimize or even avoid the consequences of inherent variations in both assembly technique and component manufacture on the characteristics of the resultant bond. It is an aim of the present invention to make the chosen bond characteristics largely independent of such variations. In so doing, the present invention necessitates neither elimination nor inclusion of manufacturing variations; it simply makes them irrelevant.

Another broadly stated object of the present invention is to minimize the need for assembler skill for creation of a proper solvent bond. Particularly it is a goal of the present invention to allow for creation of the chosen characteristics without relying on the particular techniques or steps used to create the bond. In this regard it is an object to make the resultant bond characteristics independent of the technique of introducing solvent to the assembly. It is also a goal to minimize or remove the impact of manufacturing variation on the characteristics of the bond created.

With respect to part design, it is a further object of the present invention to provide a way for the design of the parts themselves to set the characteristics of the bond to be created. In so doing, it is the purpose of the invention to allow the inherent properties of solvents to act so that they automatically create the desired characteristics.

Another broadly stated object of the present invention is to provide a design having basic design parameters from which the designs may be derived to suit the specific criteria involved. Particularly it is a goal to provide an exemplary structure through which a broad range of design parameters may be met by obvious variations.

Naturally, further objects of the invention are disclosed throughout other areas of the specification and claims.

C. BRIEF DESCRIPTION OF THE DRAWINGS

D. DETAILED DESCRIPTION OF THE PREFERRED EMBODIMENTS

Figure 1:
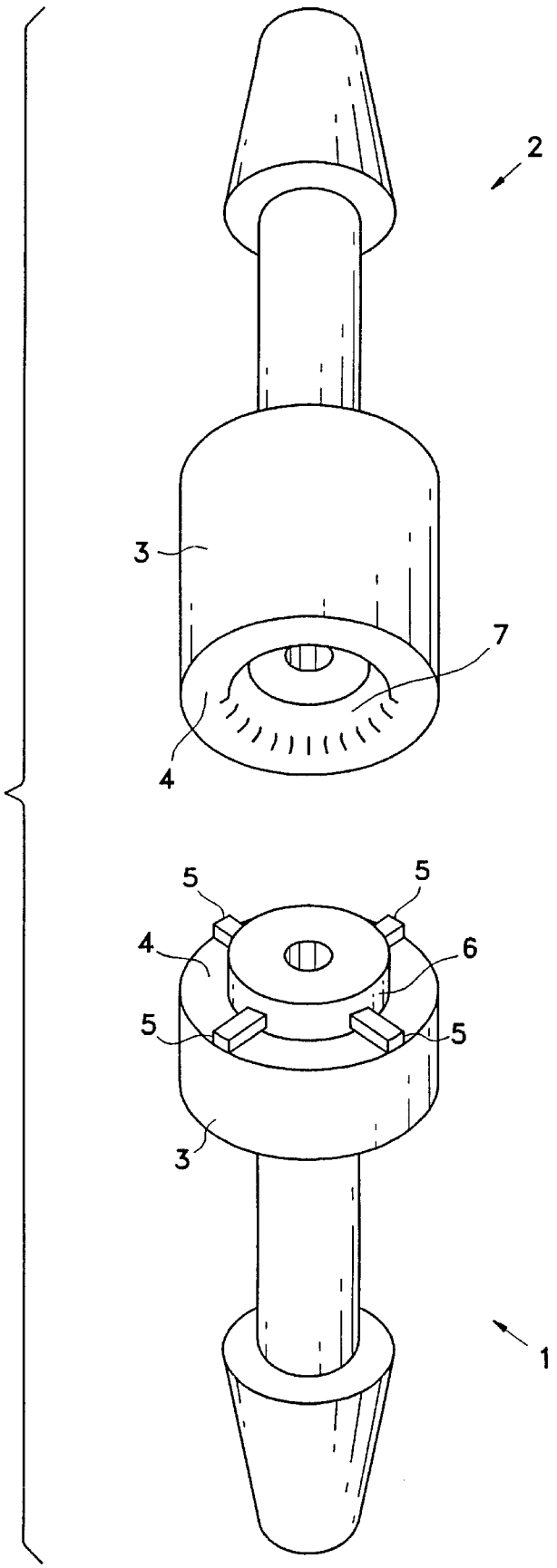
FIG. 1 is a perspective view of two parts to be bonded together according to the present invention.

Although the drawings show a unique structure according to the present invention, the invention is more fundamentally understood through the methods involved rather than the one particular design disclosed. In a fundamental sense, the present invention involves the basic step of introducing solvent to create a bond with the unique steps of creating a set or predetermined volume of dissolved material and then acting upon the material while it is dissolved. These two steps each pose unique additions to the prior art techniques. These basic steps significantly depart from the prior efforts by those skilled in the art not only in the steps themselves but in the fact that they expand the realm of design input to include the possibility of engineering specific characteristics of the solvent bond. Significantly these general concepts allow engineering of the solvent bond to occur at the part design stage rather than during the assembly stage.

The aspect of creating a set volume of dissolved or viscous material through a design of the parts has never been accomplished in the fashion of the present invention. According to the invention the designer can determine the appropriate volume of viscous material prior to its creation. This differs significantly from the prior art in which the amount of viscous material was simply happenstance in systems which did not include the need to meter solvent during the assembly phase. In the relevant prior art the amount of viscous material created was dependent upon uncontrolled factors such as the imperfections of the surfaces to be bonded and the technique of the particular assembler. A key difference for the present invention is that the volume of viscous material is predetermined at an amount which is optimally desirable for the particular characteristics desired in the final solvent bond.

The predetermination of the volume of viscous material can be accomplished in a variety of ways. Again, although the structure of the present invention is unique, the general techniques disclosed encompass a much broader scope as they open up a great possibility of designs. Certainly, the more traditional technique of externally metering the solvent introduced to the parts could be utilized. Although this, when combined with the second step of acting upon the parts while they are dissolved, falls within the scope of the present invention, it does not provide the self-optimization aspects of the other techniques disclosed.

To achieve the goal of self-optimization, the technique of creating a reservoir—that is a space between the two parts—which defines a specific volume has been developed. By defining a set volume the reservoir acts to automatically create the appropriate volume of viscous material for the desired characteristics. Certainly a variety of techniques could be used to create the reservoir. Again, one could simply separate the parts manually during assembly. This would, of course, defeat several objects of the present invention, namely, that of self-optimization and that of minimizing assembler actions. The reservoir could also be created through use of internal or external spacers which automatically create the desired reservoir volume. By having a set thickness, the spacers would act to create a set volume. This type of technique not only meets the basic requirements of the present invention but it also accomplishes the goals of self-optimization and minimizing any need for manual techniques at the assembly phase. It also enhances the consistency and reproducibility of specific characteristics by removing variables. If an external spacer is employed, it simply would be removed—without moving the parts relative to each other—prior to filling the reservoir with solvent.

Once the reservoir has been created, solvent is introduced to completely fill the reservoir. The solvent then acts upon the surfaces to create a volume of dissolved or viscous material. At some point the spacer must be removed to allow for the second step of acting upon the viscous material. The removal of the spacer can be accomplished in a variety of ways, including either manual or chemical removal. In a manual instance the spacer would be physically removed from between the parts and would thus constitute a removable shim. Again, although this falls within the scope of the present invention it does not allow achieval of the goal of self-optimization. A more preferable way to remove the spacer is to allow it to be chemically dissolved. This is a particularly desirable technique when the spacer is designed to be a series of tabs or protrusions on one or more of the surfaces. When tabs are used, it would be desirable to provide for their dissolving to be substantially complete at exactly the time when the desired amount of dissolving of the surfaces has occurred. This can be accomplished through proper sizing of the tabs such that each tab's width is less than or equal to twice its height. In this fashion the tab will be substantially dissolved—that is dissolved enough to allow the desired amount of action upon the viscous material—at the proper time thus allowing the surfaces themselves to act to time any action (as discussed below) upon the viscous material. This dissolving would, of course, occur prior to the actual curing of the viscous material.

The second general aspect of the present invention is the concept of acting upon the viscous material prior to its being cured. This differs drastically from the prior art. In the prior art, action upon the viscous material was generally avoided rather than specifically included. By acting upon the viscous material, it is meant that any type of action could be included, the object being simply the accomplishment of one or more of the following goals. First, a goal would be to mix the viscous material. This would assure that the viscous material has a uniform consistency and thus upon curing, that the bond itself would have uniform characteristics throughout. The second goal of acting upon the viscous material would be that of eliminating any pockets of solvent or any areas where the solvent has not been able to dissolve the surface. Since imperfections at even a microscopic level will always remain, this step accommodates the practical aspects of creating solvent bonds. A third goal would be that of substantially purging impurities from the viscous material. Since such parts are rarely manufactured or handled in a clean-room environment, impurities to the surfaces to be dissolved are often introduced. These impurities are a detriment to the creation of the theoretically optimal solvent bond and so should be eliminated to the degree possible. By acting upon the parts while the viscous material exists, these impurities can be substantially purged. It should be understood that total elimination is rarely accomplished. Rather, by the use of the term "substantially purged" it is meant that such impurities be reduced to the largest degree practical.

As mentioned the action upon the viscous material can be accomplished in a variety of ways. These could range from sophisticated techniques such as the use of ultrasound or external conditions to the step of simply displacing one part with respect to the other. Although the former range of possibilities might seem more highly technical and therefore more able to be controlled, they do not achieve the goal of minimizing any input at the assembly level. Rather the step of simply displacing one part with respect to the other accomplishes this very easily with minimal impact upon the assembly phase. This displacement would include a variety of techniques such as simply "squashing" the parts together to only twisting one part with respect to the other. As explained later, by applying a set force manually to compact the parts and thus "squish" the viscous material, several ends are achieved. First, displacement between the two parts occurs. This serves to mix the viscous material to some extent. Second, when the volume of viscous material is reduced, movement of the material perpendicular to the direction of displacement of the parts will occur. This not only enhances mixing the viscous material but it also aids in eliminating any pockets of solvent or non-solvent. Finally, by reducing the volume some of the viscous material is removed. Since the surface itself would contain the greatest degree of impurities and since that surface would be the first to be dissolved, thus it would also be the most fluid material.

It would thus tend to be removed first. This would thus aid in elimination of any impurities existing.

In considering the amount of displacement desirable, at least an amount of displacement equal to the largest surface deviation should be included. In this way the bond may be optimized according to the specific parts provided. As mentioned, the displacement can include decreasing the volume of viscous material (i.e. "squishing" it). Interestingly, the process through which a solvent bond is created is such that the decrease in viscous material cannot practically be overdone. Once impurities are substantially reduced, only a minimal amount of solvent is actually necessary to achieve a bond as would be most desirable in a great variety of conditions. This step of decreasing the volume of viscous material not only achieves the three goals mentioned above but it also has the effect of accomplishing other desirable characteristics such as reducing any gaps in the bonded portion, reducing any interstitials that may be contained within the parts themselves, etc.

In addition to the two basic steps of creating a set volume of viscous material and acting upon that material while it is dissolved, the methods may include the additional step of acting upon the viscous material at the optimal time. This time may be determined not simply upon the passage of time but, more accurately, upon the amount of viscous material created or the degree of dissolving having occurred. While certainly this could be empirically tied to the passage of time, the fact that solvent bonds are created in a variety of conditions, temperatures, pressures, and the like, makes the simple elapse of time less effective in optimizing the action upon the viscous material. By basing the action upon the amount of dissolving having occurred, these limitations can be avoided. Significantly the present invention affords the opportunity of automatically determining the optimum amount of dissolving having occurred. This again achieves the desired goal of minimizing the need for input or decisions at the assembly phase and enhances the avoidance of any variations in the resulting bond. It is accomplished by designing the tabs or spacers to substantially dissolve at the appropriate point. Thus by applying a small force to the parts, the force causes a displacement only when the appropriate amount of dissolving of the surfaces has occurred. Again, the extraordinary simplicity of this technique allows it to achieve the desired goals with minimal impact at the assembly phase.

As mentioned earlier, solvent may be introduced to the joint in the traditional fashion. This could involve introducing solvent to at least one of the surfaces and then joining the surfaces together. To simplify the impact of the assembly process, an enhanced technique of introducing the solvent to the area to be bonded is provided. This involves designing the surfaces such that the solvent is distributed through its own natural properties—most notably the property of capillary action. In so doing not only can the solvent be certainly distributed throughout the entire area involved (through the designer's input of course) but even the pattern of distribution can be affected through proper designs. At the assembly phase, this feature can considerably simplify the introduction of solvent. Through proper design the possibility of even dipping the part in solvent exists without over introducing solvent to the area to be bonded. By allowing for the distribution of solvent to occur through the solvents natural properties, the present invention allows the solvent itself to be a controlling factor in assuring the proper characteristics. Thus the characteristics are created independent of the technique used by the assembler of introducing the solvent to the parts. Again, this enhancement serves to achieve the desired goal of self-optimizing the process so that the designer can have a greater degree of certainty that the desired characteristics will in fact be created. The distribution of the solvent thus serves as a way of assuring the creation of the desired characteristic or characteristics.

To accomplish the appropriate distribution of the solvent through capillary action, the designer can design the part such that solvent will only be distributed in certain areas or will be distributed throughout the entire surfaces. In this fashion a solvent bond on a non-porous surface can be greatly impacted by the design of the parts. In so doing the operation of the surfaces act to create the characteristics independent of the variation inherent to any assembly process.

An ancillary benefit to the creation of a reservoir and the use of capillary action is the possibility of increasing the volume of viscous material beyond that typically possible in traditional manual techniques. In some instances the specific solvents involved evaporate so quickly that repeated application of the solvent is required in order to achieve the proper amount of dissolving. As an example, the use of methyl chloride—which boils in ones hand—requires repeated applications in most situations. The present invention accommodates this characteristic by isolating the solvent within a reservoir as previously discussed. Through the use of capillary action and the use of a set reservoir, greater volumes of solvent, and therefore greater volumes of viscous material, can be created without the need for repeated application of the solvent.

In utilizing capillary action, it should be noted that in many design instances it may be desirable to provide for parallel surfaces. In contrast to the prior art in which tapered surfaces were utilized, capillary action will work on parallel surfaces as well. In addition, through using parallel surfaces a more even bond can be created such that equal amounts of solvent per unit surface area will be introduced. In contrast, the prior art which utilized divergent surfaces would cause the majority of bonding to occur at the surfaces' most narrow point.

From the perspective of the scope of the present invention, it should be understood that the methods disclosed herein are shown in their most fundamental forms for the purposes of expanding the great variety of design possibilities. Since each method could be varied and combined in different ways to achieve specific characteristics for a particular application, such variations are intended not only to fall within the scope of the present invention but also to be pursued as each situation may warrant. In keeping with this goal only the most basic design concepts and structure are discussed. Specific applications and modifications can be readily achieved by those skilled in the art once the basic concepts are understood.

As mentioned a basic structure is also disclosed. Referring to FIG. 1, it can be seen that the invention is shown on a representative item, in this case a barbed fitting. The fitting is composed of a male part (1) and a female part (2) which are to be solvent bonded together. Both male part (1) and female part (2) include a cylindrically shaped shoulder (3) which terminates in the bonding surface (4). As can be seen on male part (1), bonding surface (4) has integral to it a series of tabs (5). These tabs (5) extend for a great portion of the width of bonding surface (4). In the vicinity of bonding surface (4) on male part (1), is male sleeve (6). Male sleeve (6) is designed to fit into female sleeve (7) and thus serves to hold the parts in a fixed relationship, to one another in three-dimensional space prior to creation of the solvent bond. Such sleeves should not hold the parts too securely after the bond is created so that any inherent movement necessary during curing is possible.

Figure 2:
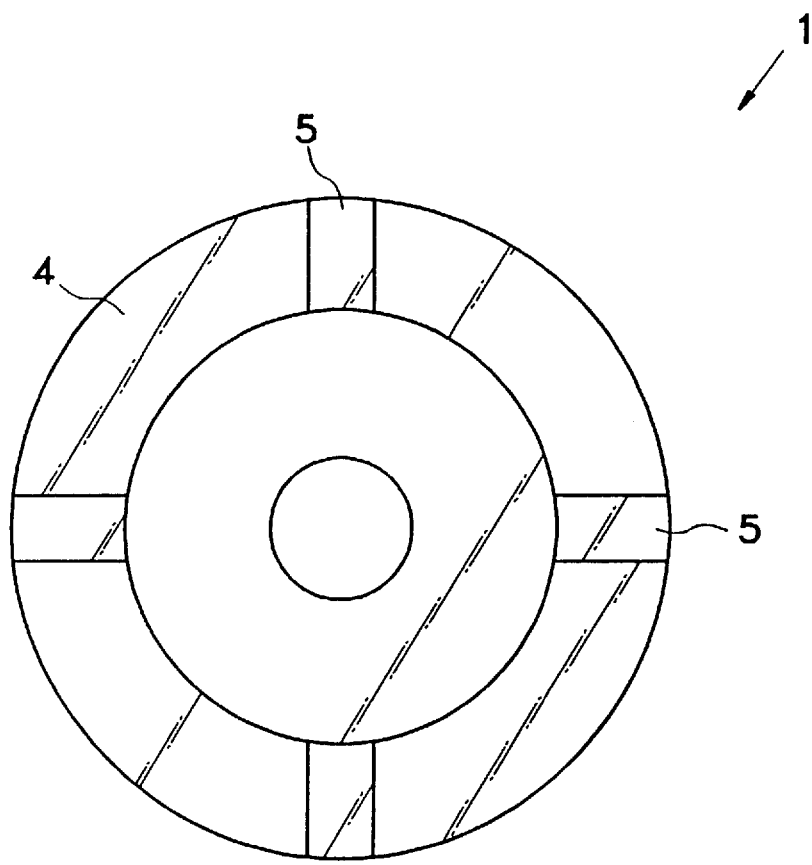
FIG. 2 is an end view of the part to be bonded which has tabs on its surface.

Referring to FIG. 2 it can be seen that several tabs (5) are included on bonding surface (4) of male part (1). Naturally the tabs could be combined on either male part (1) or female part (2) or could be separately included as removable shim (12), also shown in FIG. 1a. Importantly in this particular embodiment, there are at least three tabs (5). This serves to provide a planer support for the two parts relative to each other such that bonding surfaces (4) can be held in parallel relationship. Naturally a variety of shapes for tabs (5) could be provided. In addition, tabs (5) could actually be a series of bumps or protrusions on one or more of the bonding surfaces (4).

In creating the solvent bond, male part (1) and female part (2) may be fitted together such that male sleeve (6) fits within female sleeve (7) and such that tabs (5) of male part (1) touch bonding surface (4) of female part (2). This creates a set reservoir (8) between male part (1) and female part (2). This reservoir has then introduced to it the solvent to create the solvent bond.

Figure 3:
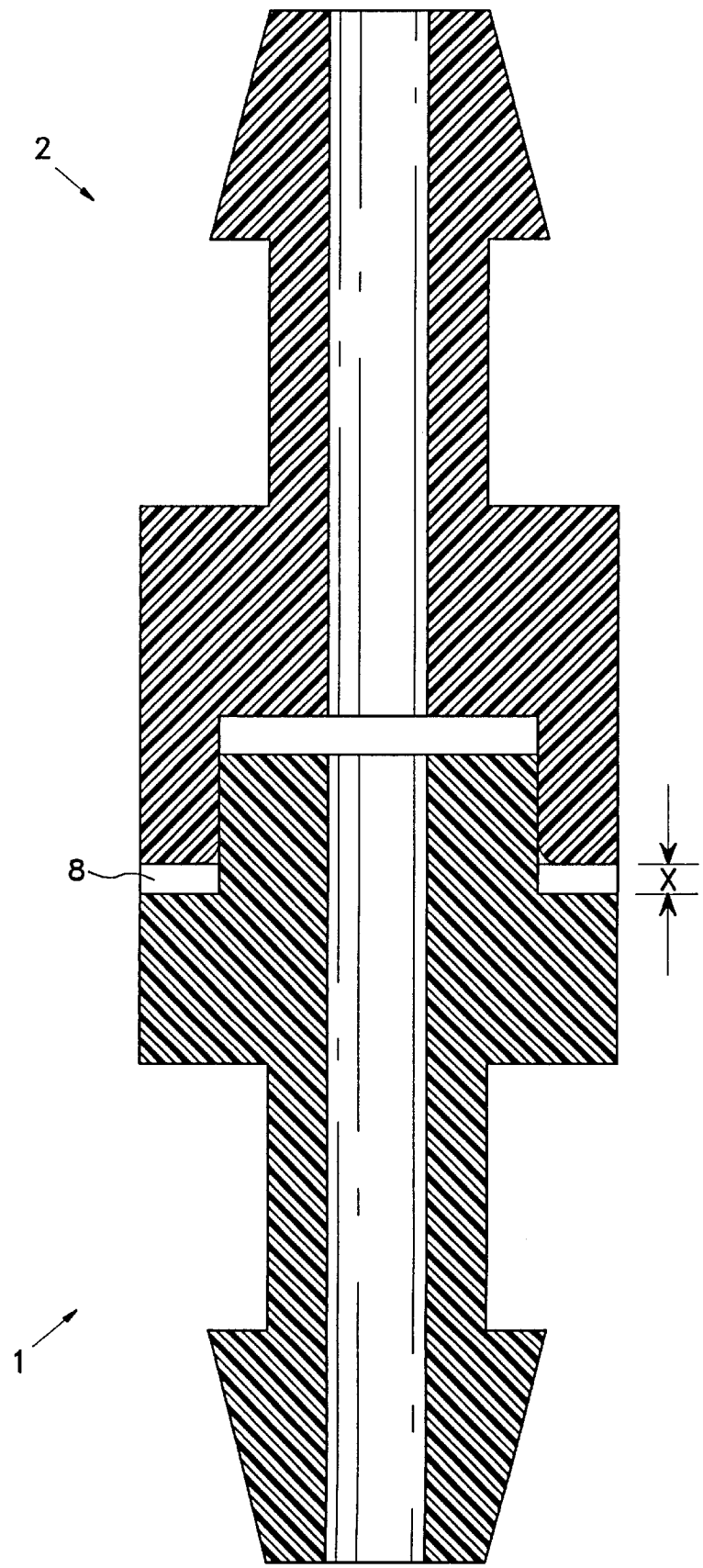
FIG. 3 is a side view in cross section of the two parts as assembled prior to the introduction of solvent.
Figure 4:
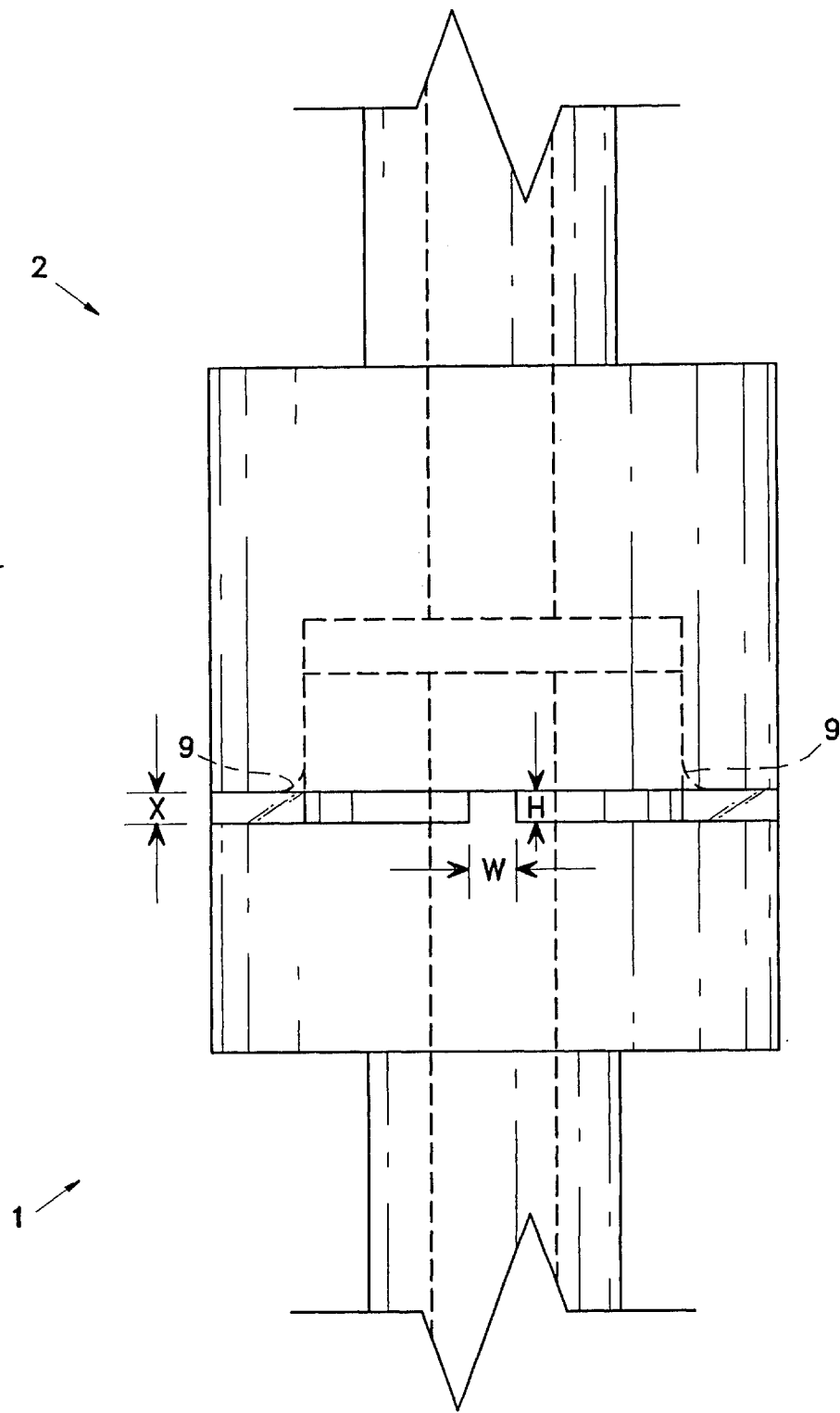
FIG. 4 is a side view of that configuration depicted in FIG. 3 focusing on only the area to be bonded.

As can be seen through FIGS. 3 and 4, reservoir (8) is defined by bonding surfaces (4) being held a fixed distance apart. This fixed distance (X) is substantially constant across most areas of bonding surfaces (4). Thus, bonding surfaces (4) are parallel to one another.

Once solvent is introduced, capillary action will cause the solvent to wick throughout all areas of bonding surfaces (4). In order to facilitate wicking about the four areas of bonding surfaces (4) defined by the four tabs (5), fluid connection between each area is provided. Referring to FIG. 4 it can be seen that this fluid connection is provided through rounding the inner edge (9) of bonding surface (4) of female part (2). In order to facilitate fluid connection, it is desirable that the opening created by rounding of the inner edge (9) of this female bonding surface be sufficiently large such that the meniscus created by the solvent be able to pull solvent through the opening. This thus serves as a means for distributing the solvent that is integral to the part design.

Referring also to FIG. 4 it can be seen that tab (5) when viewed on end has a width (W) and a height (H). Certainly height (H) will be equal to fixed distance (X) which separates bonding surfaces (4). Importantly, width (W) is no more than twice height (H). This allows the dissolving of tab (5) to occur at the proper time. Naturally width (W) could be substantially less than height (H) in instances where a lesser amount of viscous material is desired. In this fashion tab (5) will substantially dissolve prior to the full amount of dissolving possible. Tab (5) could also have a stepped shape.

Figure 5:
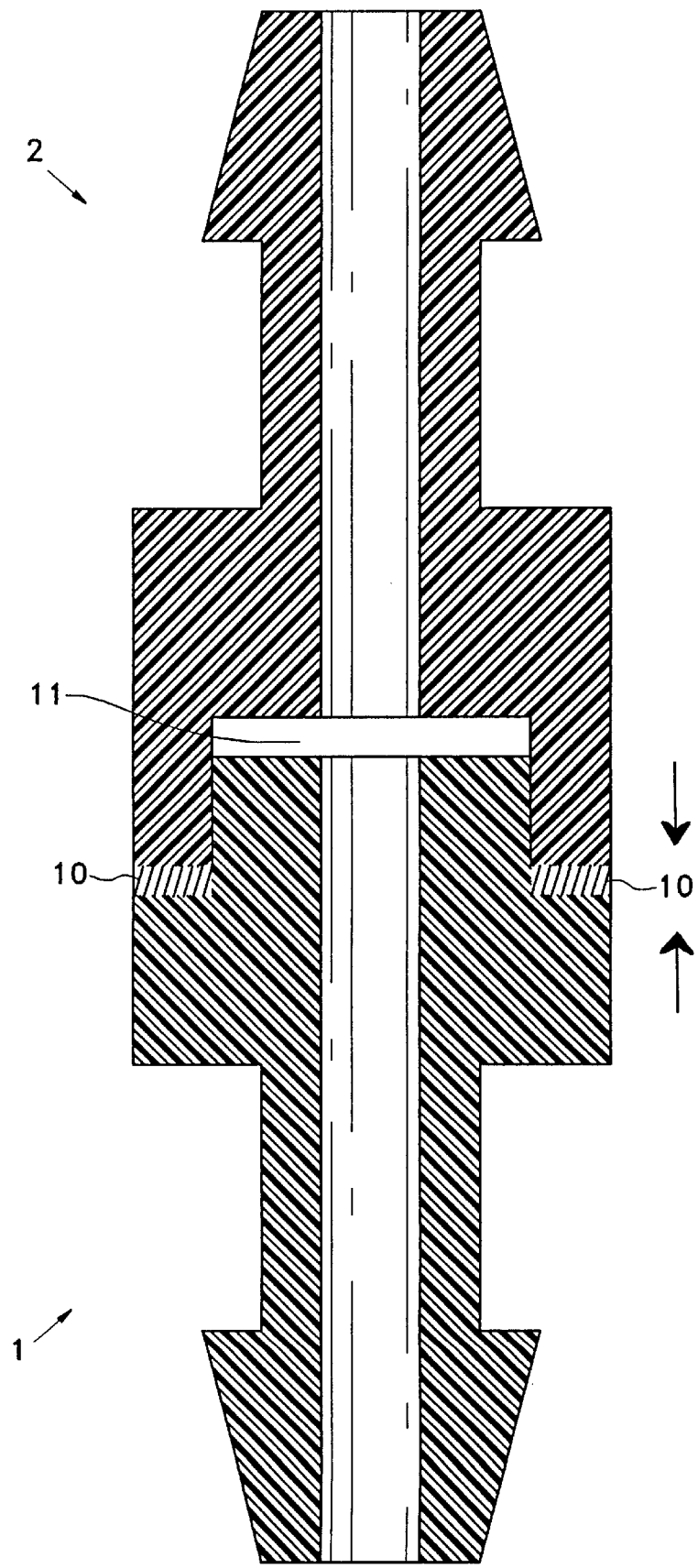
FIG. 5 is a side view in cross section of the two parts after the introduction of solvent and after acting upon the viscous material.

Referring to FIGS. 4 and 5, it can be seen that once solvent is introduced to reservoir (8), a volume of viscous material is created. The decrease in this volume is effected by simply displacing male part (1) and female part (2) together as shown by the arrows. This effects a decrease in fixed distance (X) and will decrease the amount of viscous material by forcing some outside the solvent bonded area in the external vicinity of shoulders (3). This affords the advantages discussed earlier. After the displacement, the parts are left to cure such that a solvent bond is created in the area where bonding surfaces (4) existed. Since one integral part is now created, bonding surfaces (4) now cease to exist and are replaced by solvent bonded area (10).

Curing can then be accomplished by simply letting the parts dry—that is allowing the solvent to evaporate from all locations within solvent bonded area (10). To achieve an optimum bond, male part (1) and female part (2) should be free to move with respect to each other and shrink as may naturally occur. Importantly, male sleeve (6) and female sleeve (7) should remain free to move with respect to one another. In addition some small clearance (11) may optimally be included to assure that male part (1) and female part (2) are not held apart undesirably.

Again, this structure represents a relatively simple representative structure to accomplish the methods of the present invention. The foregoing discussion and the claims which follow describe the preferred embodiments only. Particularly with respect to the claims it should be understood that changes may be made without departing from their essence. In this regard it is intended that such changes would still fall within the scope of the present invention. It simply is not practical to describe and claim all possible revisions to the present invention which may be accomplished. To the extent such revisions utilize the essence of the present invention, each would naturally fall within the breath of protection encompassed by this patent. This is particularly true for the present invention since its basic concepts and understandings are fundamental in nature and are intended to open an opportunity for engineers to specifically preengineer solvent bonded joints to accomplish the particular characteristics desirable for their application.

I claim:

1. A joint for bonding items together by a solvent comprising:

(1) a first surface made of a nonporous material which is soluble in the solvent being used;

(2) a second surface made of a nonporous material which is soluble in the solvent being used wherein said first and second surfaces are to be bonded together;

(3) a means for retaining said surfaces in a desired relation to each other in three-dimensional space, said means having a fixed relationship to each of said surfaces;

(4) a means for creating a first reservoir between said surfaces prior to bonding wherein said first reservoir is adjacent to both of said surfaces and wherein said first reservoir establishes a first volume into which said solvent is introduced to fill said first volume; and (5) a means for creating a second reservoir between said surfaces prior to bonding and after establishment of said first reservoir wherein said second reservoir is adjacent to both of said surfaces and wherein said second reservoir established a second volume that is smaller that said first volume and which is appropriate to create a bond having a predetermined bond characteristic.

2. A joint for bonding items together by a solvent as described in claim 1, and further comprising a means for distributing said solvent wherein said distribution means is integral to said surfaces.

3. A joint for bonding items together by a solvent as described in claim 2 wherein said means for creating a first reservoir comprises a spacer having a predetermined thickness positioned between said surfaces.

4. A joint for bonding items together by a solvent as described in claim 3 wherein said means for distributing comprises said first and second surfaces and wherein said surfaces are parallel.

5. A joint for bonding items together by a solvent as described in claim 4 wherein said spacer comprises at least one protrusion on one of said surfaces.

6. A joint for bonding items together by a solvent as described in claim 5 wherein said means for distributing further comprises a means for fluidly connecting all areas of said surfaces together.

7. A joint for bonding items together by a solvent as described in claim 6 wherein said protrusion comprises a plurality of tabs integral to one of said surfaces.

* * * * *